(12) United States Patent
Gorelik et al.

(10) Patent No.: US 7,970,713 B1
(45) Date of Patent: Jun. 28, 2011

(54) METHOD AND APPARATUS FOR AUTOMATIC PRICING IN ELECTRONIC COMMERCE

(75) Inventors: Vladimir Gorelik, Palo Alto, CA (US); Andrew Ian Atherton, San Francisco, CA (US); Nina Barrameda Zumel, San Francisco, CA (US)

(73) Assignee: OIP Technologies, Inc., San Francisco, CA (US)

( * ) Notice: Subject to any disclaimer, the term of this patent is extended or adjusted under 35 U.S.C. 154(b) by 1340 days.

(21) Appl. No.: 09/568,001

(22) Filed: May 10, 2000

(51) Int. Cl.
*G06F 17/00* (2006.01)

(52) U.S. Cl. ....... 705/400; 705/1.1; 705/7.29; 705/7.35; 705/26.1; 705/26.61

(58) Field of Classification Search .................. 705/400, 705/1.1, 7.29, 7.35, 26.1, 26.61
See application file for complete search history.

(56) References Cited

U.S. PATENT DOCUMENTS

| | | | |
|---|---|---|---|
| 3,581,072 A * | 5/1971 | Nymeyer | 705/37 |
| 5,331,544 A * | 7/1994 | Lu et al. | 705/10 |
| 5,778,357 A * | 7/1998 | Kolton et al. | 707/2 |
| 5,873,069 A * | 2/1999 | Reuhl et al. | 705/20 |
| 6,196,458 B1 | 3/2001 | Walker et al. | |
| 6,230,150 B1 * | 5/2001 | Walker et al. | 705/400 |
| 6,233,564 B1 | 5/2001 | Schulze, Jr. | |
| 6,424,949 B1 | 7/2002 | Deaton et al. | |
| 6,477,180 B1 | 11/2002 | Aggarwal et al. | |
| 6,539,392 B1 * | 3/2003 | Rebane | 707/101 |

FOREIGN PATENT DOCUMENTS

WO    WO 02/010961    *    7/2001

OTHER PUBLICATIONS

"Navigating the Intersection of forecasting, market research and pricing" by Cook, Aug. 1995, Pharmaceutical Executive, v15, n8, p. 54-58.*
"Pricing research for decision making" by Mohn, winter 1995, Marketing Research, a Magazine of Management & Applications, v&n1 p. 10-19.*
"Pricing decision in small firms: Theory and practice" by Cunningham, 1993, Management Decision, v31n& p. 46-55.*
A guide to conducting marketing research on the Internet by Emery,Jan. 1996 in Potentials in Marketing v23, n1, p22, entire document.*

* cited by examiner

*Primary Examiner* — Janice A. Mooneyham
*Assistant Examiner* — Michael J Fisher
(74) *Attorney, Agent, or Firm* — Hickman Palermo Truong & Becker LLP

(57) ABSTRACT

An automatic pricing method and apparatus for use in electronic commerce environments is described. Automatic pricing uses live price testing to estimate and measure demand for specific products—taking into account where appropriate, a vendor selected segmentation scheme. The results of live price testing are compared using a vendor selected goal function, e.g. profit maximization, to select a new price. A goal function that balances short term gains versus long term gains based on customer lifetime value is described. The live price testing approach used is designed to minimize losses due to price testing through statistical methods. Additionally, methods for distributing price testing across time so as to avoid problems caused by too many ongoing tests as well as side effects from testing are described. The selected price is a win for both purchasers and vendors as the automatic price will approximate the efficiency of a reverse auction without the inconvenience of the auction format while being goal maximizing for the vendor. For example, a vendor that normally sets prices of items for sale to customers can use embodiments of the invention to great effect.

62 Claims, 7 Drawing Sheets

METHOD AND APPARATUS FOR AUTOMATIC PRICING IN ELECTRONIC COMMERCE

RELATED APPLICATIONS

This application relates to the following group of applications. Each application in the group relates to, and incorporates by reference, each other application in the group. The invention of each application is assigned to the assignee of this invention. The group of applications includes the following.

| Title | First Inventor | Filing Date | Serial Number |
|---|---|---|---|
| Method and Apparatus for Determining Customer Lifetime Value and Setting Price | Vlad Gorelik | May 10, 2000 | 09/567,946 |

BACKGROUND OF THE INVENTION

1. Field of the Invention

This invention relates to the field of pricing. In particular, the invention relates to methods and apparatus for automatically adjusting pricing on items in an electronic commerce environment.

2. Description of the Related Art

Electronic commerce sites enable business to sell products and services to consumers and other businesses. FIG. 1 broadly illustrates the basic configuration used by electronic commerce vendors. A web server 100 is coupled to a database 102 that includes pricing information for products, e.g. the product 105. When a client, not shown in FIG. 1, requests a web page, e.g. the web page 104, over a network such as the Internet, the web server 100 generates the web page 104. The web page 104 may include a reference to the product 105, e.g. a textual description, a picture, and/or some other reference, as well as a price 106. The dashed arrows in FIG. 1 illustrate that the web page 104 is generated from the web server 100, e.g. for the manual elements of the web page 104, and the database 102, e.g. for dynamic information such as product information and pricing. Logs such as the logs 110 can be maintained by the web server 100 to monitor usage of the sites hosted by the web server 100. Additionally, other servers may be used by the vendor to support the electronic commerce site, e.g. application servers, customer relationship management (CRM) systems, and/or other systems.

For a particular product, e.g. a book, a compact disc, a plane ticket, a grocery item, etc., the pricing displayed is typically controlled by one or more product merchandisers. These merchandisers are people with product area specific qualitative knowledge. The merchandisers set prices for items falling within their categories of pricing expertise in conjunction with other business policies.

For example, in the clothing business, there may be a product merchandiser who specializes in women's handbags and another in women's shoes. In order to set the price for an item, the merchandiser will qualitatively evaluate the market and the good considering factors such as: the good itself, the brand strength, market conditions, business goals, seasons, past sales, etc. Looked at from a microeconomics standpoint, the merchandiser is guessing the shape of the demand curve. And therefore, guessing the optimal price. This pricing approach will be referred to as manual pricing.

FIG. 2 illustrates the impact that traditional, manual, pricing methodologies have as demand changes over time. The graph 200 shows the passage of time on the X-axis. The relative demand of a given product over time is represented by the dotted curve 202. The pricing under a manual pricing model is shown as the stepped solid line 204. Notice that while the manual price 204 can be adjusted, e.g. by a merchandiser, based on current market conditions, it only roughly tracks the demand, and therefore the optimal price.

Thus, at times when demand is peaking—and therefore higher prices could be charged—the manual price does not respond. Similarly, as demand dips sharply, the manual price does not respond either. Further, because of the need for manual intervention to adjust the manual price 204, the price may not be adjusted frequently enough to capture either large or small market trends.

As the number of items that need to be priced grows and the business rules for determining prices become more complex, the manual pricing model becomes extremely untenable.

Some automated pricing models have been developed that facilitate the adjustment of manual prices based on predictive estimates of demand. These models typically emulate the assumptions that a merchandiser would use and can automate the process of adjusting prices in response to the inputs to the predictive models. The results do not look significantly different from FIG. 2.

In order to address the problems of manual pricing, some electronic commerce providers have adopted auction and/or reverse auction models, as well as variants. Priceline.com with its "Name your price"-style services for airline tickets, groceries, and gasoline, is a notable example of a variant of a reverse auction. However, using a reverse auction comes at the cost of convenience to the transaction, and in Priceline.com's case, consumer choice.

Accordingly, what is needed is a pricing model that allows sellers to automatically adjust the prices of products, and services, for sale in non-negotiated and non-auction settings to provide efficient pricing for both buyers and sellers. Furthermore, an approach for determining the lifetime value of a customer should be provided to allow the vendor to set prices that balance long term gains, e.g. customer repeat business, versus short term gains.

SUMMARY OF THE INVENTION

A automatic pricing method and apparatus for use in electronic commerce environments is described. Automatic pricing uses live price testing to estimate and measure demand for specific products—taking into account, where appropriate, a vendor selected segmentation scheme. A segmentation scheme can be used by a vendor to differentiate between different types of customers as well as other aspects, a given product may be represented by multiple pricing units, each corresponding to different segments. For now, the term product will be used generically to refer either products, services, or specific pricing units, e.g. a product or service for a particular segment.

Automatically determined prices can be refined as demand changes over time. Accordingly, as demand for a given product changes, the price determined according to the automatic pricing method can change. Embodiments of the invention can handle low volume products by testing a group of similar products, e.g. in the same category, simultaneously to estimate demand for the group of products.

The results of live price testing are evaluated using a vendor selected goal function, e.g. profit maximization, to select a new price. Some embodiments of the invention include predefined goal functions for revenue maximization and profit maximization. Additional goal functions can be supplied by the vendor. Additionally, embodiments of the invention may include a goal function that can balance short and long term gains, based on the lifetime value of the customer, for the selected goal function.

Brute force live price testing could have extremely high testing costs. Accordingly, a rigorous testing approach is provided that significantly reduces testing costs while allowing for estimation of demand. This approach uses statistical techniques to estimate demand by testing a significantly smaller number of prices than would otherwise be required. Further, the particular testing methodology is designed to test those prices in a fashion that keeps the testing costs low. Additionally, the tested prices can be selected according to competitive research, vendor supplied suggestions, and/or other sources. The live testing process can determine, using a vendor selected goal function, which of the tested prices are better and worse than the current price for the product to a certain confidence. Then, one of the better prices can be selected.

At this point, the vendor is already doing better according to the goal function than she/he was doing before, e.g. making more money. However, the testing process can be continued to refine the price.

Once the automatically determined price is set, monitoring of what actually occurs can be compared against the predicted results for a price. If there is sufficient variance from the prediction, the product can be re-tested to select a new automatic price.

Additionally, methods for distributing price testing across time so as to avoid problems caused by too many ongoing tests as well as side effects from testing are described. For example, if Reebok™ shoes are price tested while leaving Nike™ shoes prices at the same level, the estimation of demand will be inaccurate. Accordingly, testing is distributed over time with related products price tested concurrently.

The selected price according to the automatic pricing is a win for both purchasers and vendors. The automatic price will approximate the efficiency of a reverse auction, a plus for the purchaser, without the inconvenience of the auction format. At the same time, the selected price is goal maximizing for the vendor. Accordingly, vendors with non-negotiated, non-auction pricing of products can use embodiments of the invention to great effect.

Additionally, embodiments of the invention offer features automatic price selection during liquidation using a similar live price testing method with a different goal function.

Embodiments of the invention can be provided as an outsourced service by a third party, e.g. Pricing Provider, to vendors, e.g. Vendor X. Through the establishment of communications links between Vendor X's electronic commerce facilities and the Pricing Provider, prices for items seen by purchasers to the Vendor X's web site can be provided by the Pricing Provider. Alternatively, the vendor herself/himself can be provided embodiments of the invention, e.g. software and/or hardware, to provide pricing services.

DETAILED DESCRIPTION

A. System Overview

Figure 1:
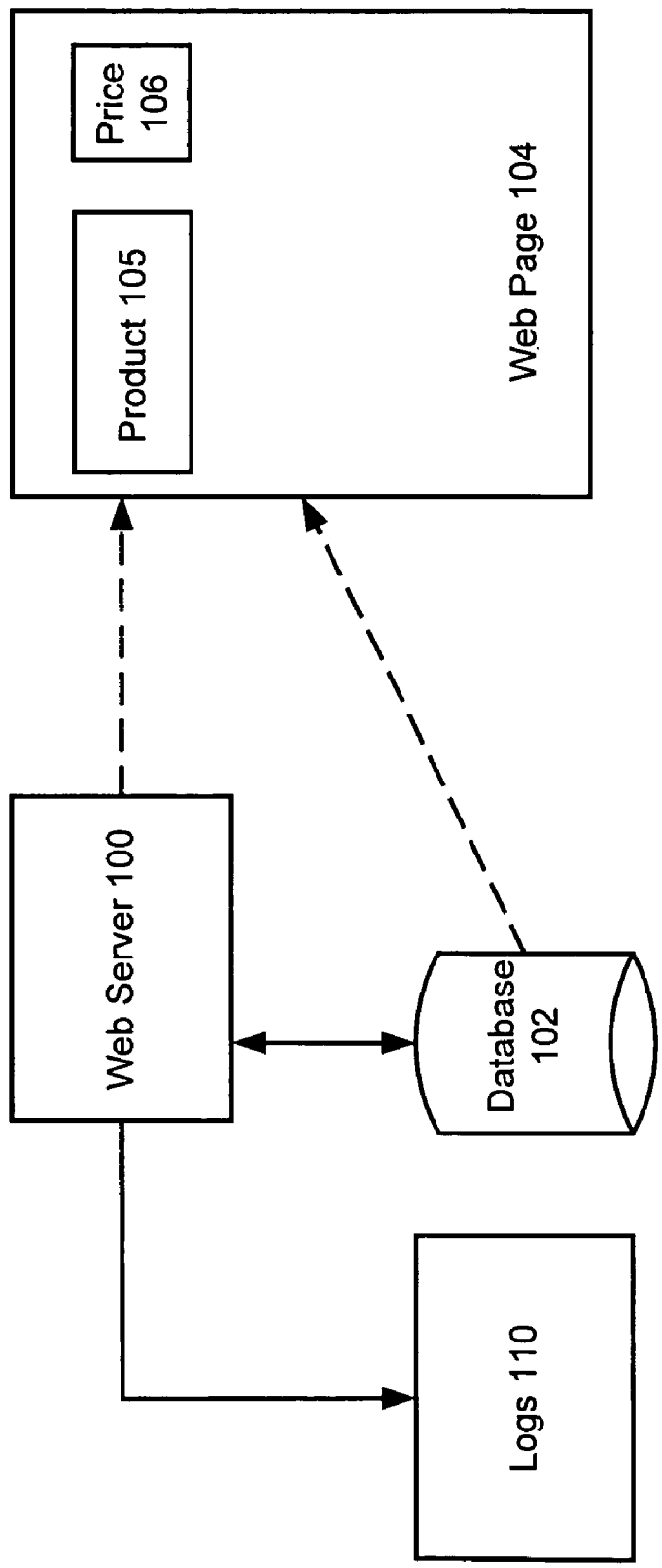
FIG. 1 illustrates a prior art electronic commerce system.

Electronic commerce vendors face unique hurdles in establishing prices. First, the present day marketplace is such that a number of competitors will price items at, or below, cost. How should a vendor respond to those actions? Similarly, with shopping robots, or agents, consumers who are price conscious can easily search dozens of similar vendors for a particular good or service drastically increasing the speed at which pricing changes influence customer perceptions.

One solution is to move away from traditional, or manual, pricing towards a more automatic pricing model. This model is designed to help vendors price their products and services, appropriately, even when competitors are dropping prices or some customers are so value conscious they are using shopping robots.

Further this model is able to measure actual, current demand for a particular product—and more particularly a particular pricing unit—through live price testing. Those results can be incorporated to allow a vendor to optimize each price according their pricing strategy.

First, the conceptual framework used by embodiments of the invention will be considered. Next, the configuration of an electronic commerce environment according to embodiments of the invention will be considered. Then, the methods for testing and adjusting prices will be considered in greater detail with reference to the goals of automatic pricing. Finally, additional embodiments of the invention will be considered.

B. Conceptual Framework

Pricing for an item should be capable of taking into account factors other than just the particular item. More specifically, a segmentation model such as the segmentation model 300 of FIG. 3 can be used to set prices at a finer grained level. Embodiments of the invention are flexible enough to account for vendor specific segmentation schemes.

The segmentation model 300 is an example segmentation scheme used by vendors according to some embodiments of the invention. Three segmentation axes are defined: SKU 304, e.g. individual pricing units for a product; seasonality 302; and customer segments 306. The customer segments 306 may be defined according to the system used by the customer, e.g. from clustering or other data analysis techniques. Similarly, the seasonality 302 can be determined from the vendor's data.

Thus, for a particular SKU, e.g. a Brand X Pocket Umbrella, there may be multiple pricing units, e.g. the pricing unit 310, for each customer segment and season. Thus, the pricing unit 310 may represent the umbrella for new customers (a segment) in winter. Which can be discretely priced as compared to existing customers for that same season as represented by a different pricing unit 310.

Further, although the discussion thus far has been in terms of products, the discussion applies with equal force to services, e.g. airline tickets, etc. Also, sometimes the discussion may refer to a web page, or web site, etc., including a product. For obvious reasons, most tangible goods—and even digital goods—are not actually part of the web site, but rather some reference to them is included in the web site, e.g. photograph, narrative description, etc. Actual fulfillment of a purchase of a product, whether tangible or digital, is a separate process not directly considered here.

Because efficient live price testing requires a certain minimum sales velocity, e.g. customers looking at and buying/not buying a product, clustering is supported within the segmentation scheme. For example, several related products with low sales could be clustered together for testing as a single pricing unit. Similarly, several customer segments could be clustered to allow for the case where there are insufficient customers in some segments. Several examples may be helpful: the particular pricing unit being tested may represent Brand X Pocket Umbrellas and Brand Y Mini-Umbrellas for the customer segment new customers. Similarly, the pricing unit may represent Brand X Pocket Umbrellas for both new and existing customers, etc. The particular clustering selected may be determined by the vendor, by data analysis, and/or through an evaluation of which clusters will produce sufficient sales velocity for live price testing. The particular clustering used at a given time can be dynamically determined and adjusted, e.g. based on current sales velocity.

Figure 3:
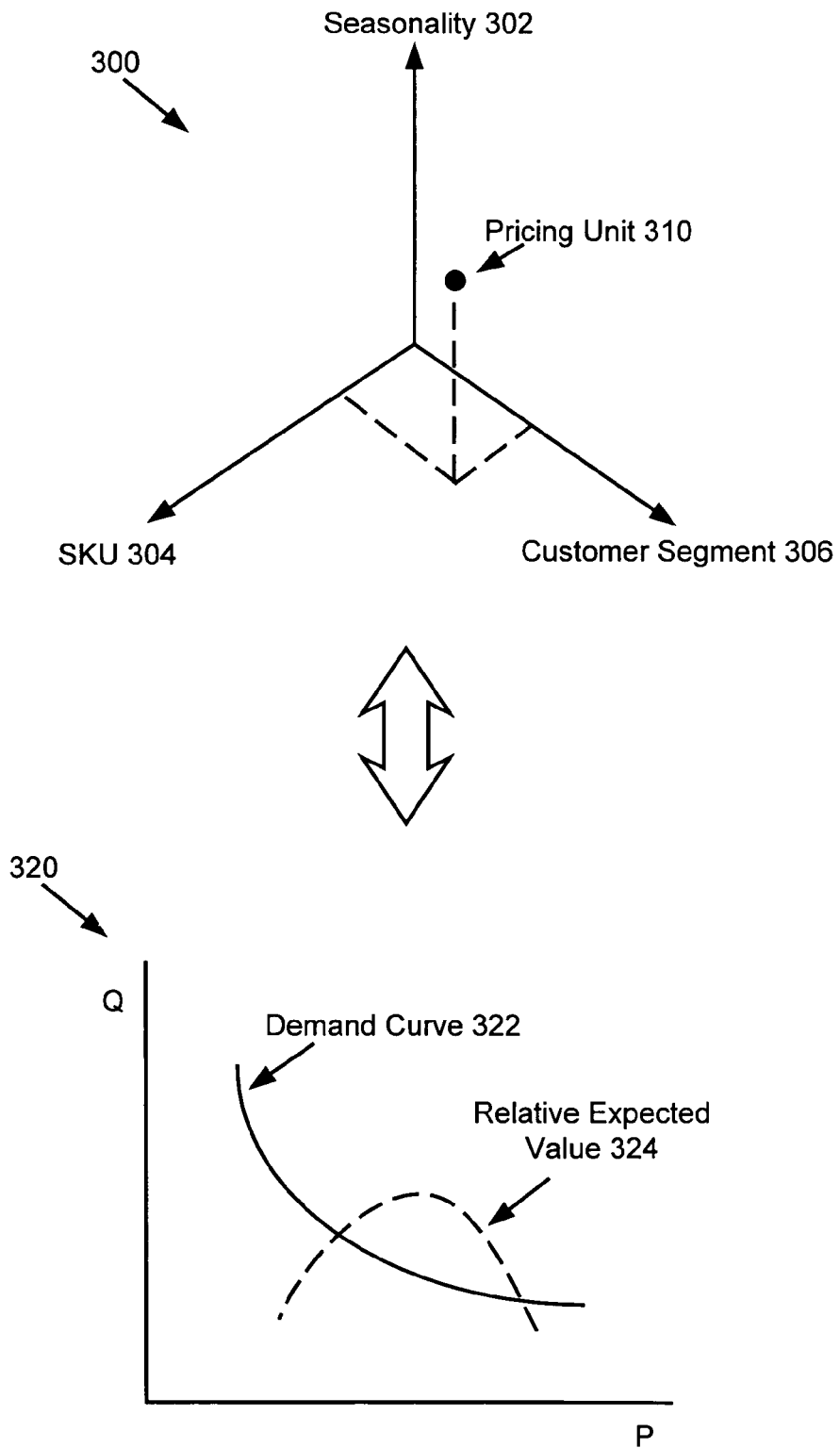
FIG. 3 illustrates the segmentation model used to identify pricing units and a demand curve for a pricing unit.

Returning to the pricing model, from microeconomics, we can predict that for a given pricing unit, e.g. the pricing unit 310 (a Brand X Pocket Umbrella, winter season, new customers), a demand curve will exist as shown in the graph 320 of FIG. 3. The demand curve 322 is shown as a solid line. As in standard economic theory, the curve is downward sloping so that as price increases, quantity decreases.

Similarly, the relative expected value 324 shown as a dotted line represents the value of selling different quantities. The relative expected value 324 can represent price times quantity, e.g. revenue. Other expected value functions may be used, e.g. profit, e.g. price less cost multiplied by the quantity, etc. For a given pricing unit, the expected value 324 has a maximum. Ideally, the pricing model should select the price corresponding to that maximum at all times.

The precise shape of the demand curve 322 in FIG. 3 is based on conjecture. The actual demand curve may vary substantially from a predicted demand curve and will change over time, e.g. as in FIG. 2 where the demand 202 changes over time. The estimation of actual demand therefore is a process used by embodiments of the invention to set prices.

However, for the same reason that the demand curve 322 cannot easily be exactly measured, the expected value 324, is not easy to determine. Accordingly, in order to set a price that will come close to maximizing expected value over time, a systematic approach to determining the demand curve 322 must be used.

The environment used by embodiments of the invention will now be considered together with the configuration of an electronic commerce vendor to use embodiments of the invention.

C. Architecture Configuration and Details

Figure 4:
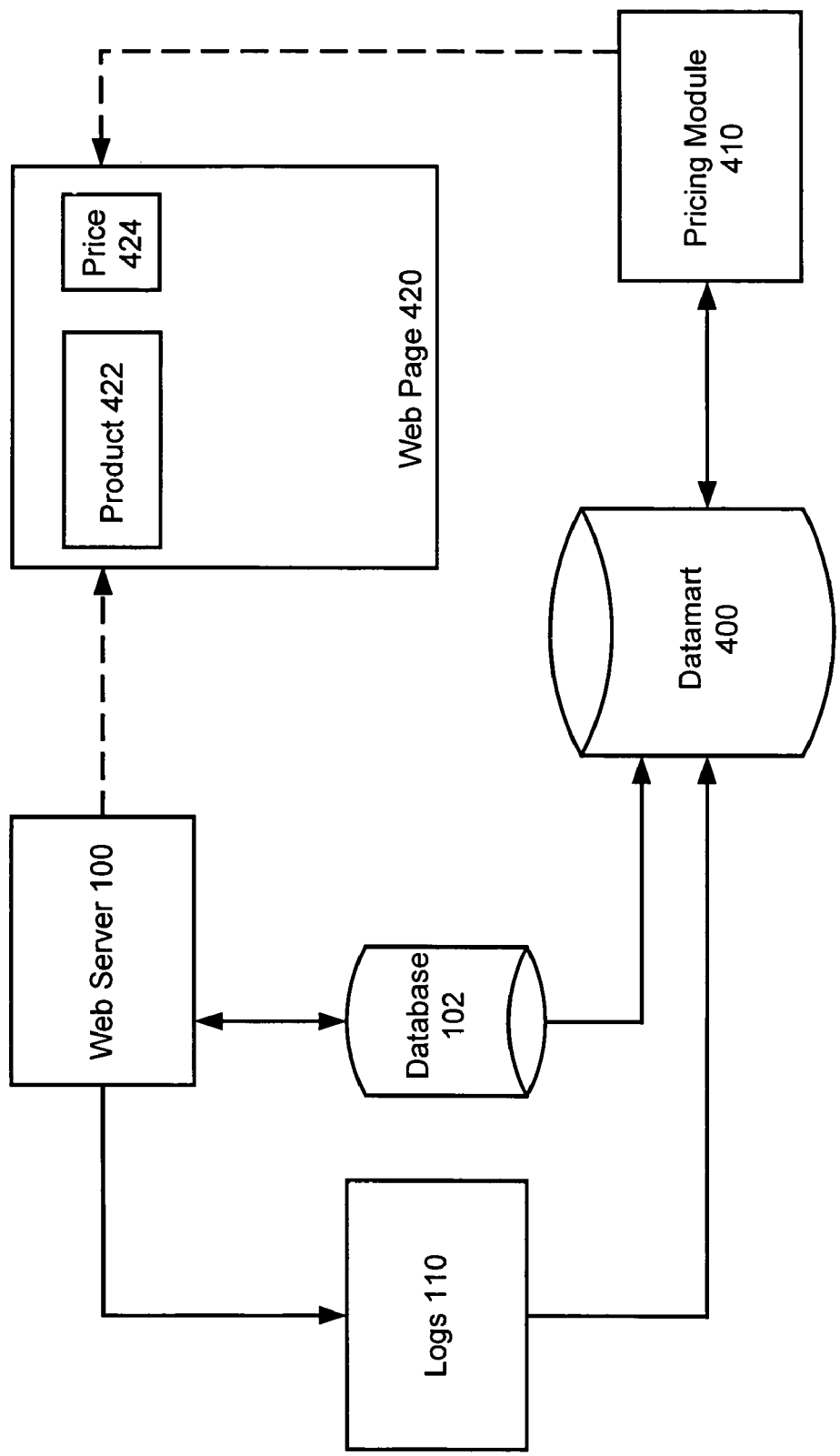
FIG. 4 illustrates an electronic commerce system according to one embodiment of the invention.
Figure 5:
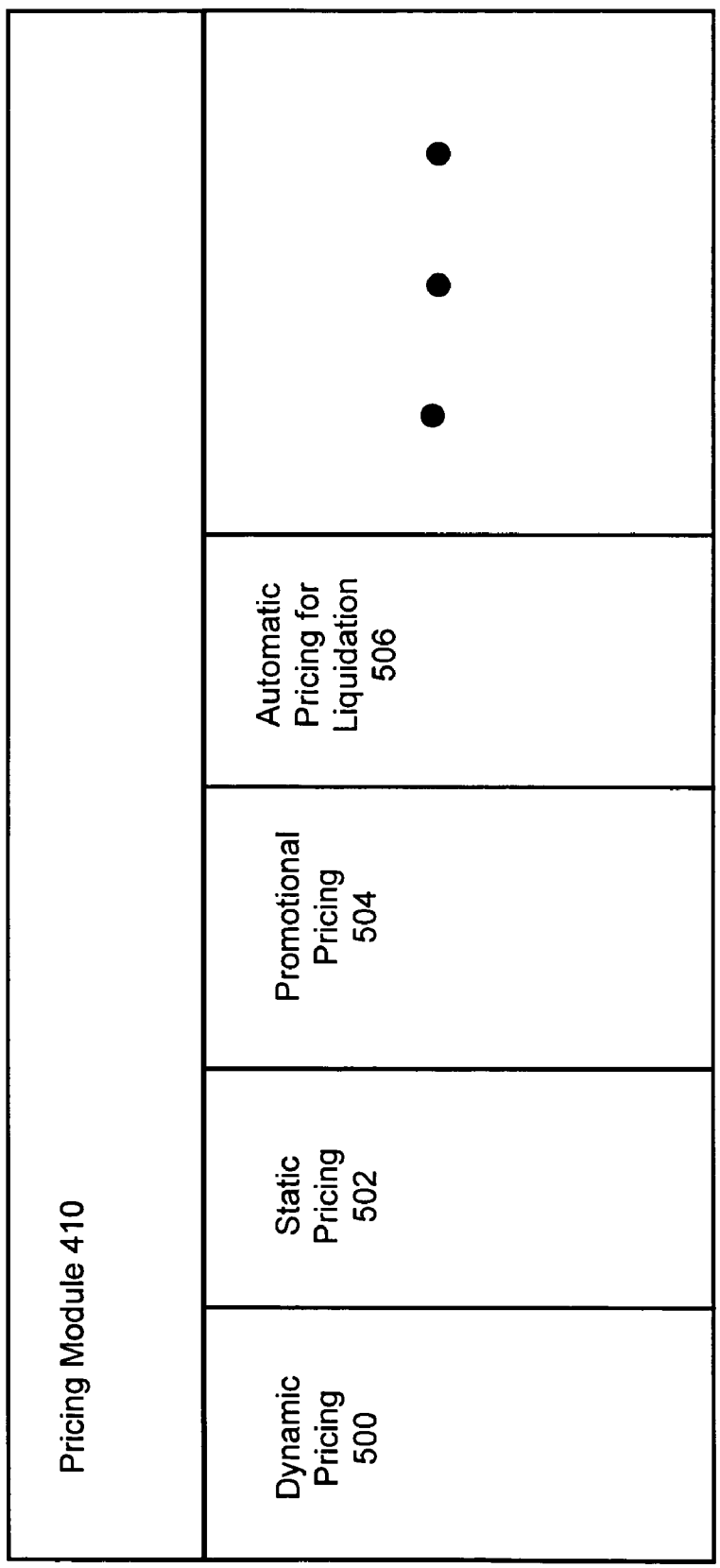
FIG. 5 illustrates components of a pricing module according to one embodiment of the invention.

FIGS. 4 and 5 illustrate the system environment used by embodiments of the invention in greater detail. The configuration of FIG. 4 is designed in to interface with existing electronic commerce systems, e.g. the electronic commerce environment of FIG. 1.

Architecture

The following lists the elements of FIG. 4 and describes their interconnections. FIG. 4 includes the web server 100, the database 102, the logs 110, the datamart 400, the pricing module 410, and the web page 420. The web page 420 includes the product 422 and the price 424.

The following describes the uses of the elements of FIG. 4. The web server 100 is a web server. Standard web servers such as Apache™ and Internet Information Server™ can be used as the web server 100. The web server 100 produces log files, e.g. the logs 110. The logs 110 will include standard information as that found in a common logfile format, or other specialized information. For example, if the web server 100 can identify the paths of individual users, then per user information could be reviewed instead of, or in addition to, standard web logs. The common logfile format is better described at <http://www.apache.org/docs/mod/mod_log_common.html>. Additionally, the logs 110 may include transaction logs of completed purchases made using the web server 100.

The electronic commerce environment of FIG. 4 differs from the prior art systems in that prices, e.g. the price 424, is no longer provided by the vendor's database, e.g. the database 102. Instead, the price is provided by the pricing module 410. The pricing module 410 will determine the price according to analysis of data in the datamart 400 and the vendor selected pricing approach for a pricing unit. The datamart 400 and pricing module 410 can be remotely hosted relative to the servers supporting the web server 100. They can also be operated by a third party, e.g. as hosted application. This could be used to allow a single third party to provide the datamart 400 and pricing module 410 to multiple electronic commerce vendors. Alternatively, a given electronic commerce vendor can operate their own datamart 400 and pricing module 410 according to specifications provided by a third party together with suitably provided programs. The datamart 400 and the pricing module 410 can be supported by one or more computer systems.

The terms "program", or "computer program", as used in this application, refers to any sequence of instructions designed for execution on a computer system. A program may include a subroutine, a function, a procedure, an object method, an object implementation, an executable application, an applet, a servlet, a source code, an object code, and/or some other sequence of instructions designed for execution on a computer system.

Although a framework where the pricing module 410 directly supplies the price to the web page is shown, the pricing module 410 could update the database 102. The choice of configurations may depend on the vendor's preferences as well as how the services provided by the pricing module 410 are licensed to vendors.

Now, the pricing module 410 will be considered in greater detail. Then, the operation of different pricing modes within the pricing module 410 will be considered.

Pricing Module

FIG. 5 includes the pricing module 410. The pricing module 410 includes several pricing modes: automatic pricing 500, manual pricing 502, promotional pricing 504 and automatic pricing for liquidation 506. Additional pricing modes can be provided by the supplier of the pricing module 410, third parties, and/or the electronic commerce vendors themselves. The pricing modes can be implemented using one or more computer programs for execution on one or more computer systems.

The operation of the pricing module will now be considered in greater detail. The pricing module 410 provides an administrative interface to allow an electronic commerce vendor to set up their site for interaction with the pricing module 410. This administrative interface can be web based using a web server coupled to the pricing module 410.

Additionally, the administrative interface allows the vendor to select pricing modes on a per pricing unit basis. Thus, a single product may be priced using multiple pricing modes depending on the vendor's selection. The vendor can continuously adjust the pricing mode selected for an item. Additional administrative features are described below in connection with each pricing mode.

The setup process allows the electronic commerce vendors to provide data about their products, or metadata. This would include, their segmentation scheme, categories of items, which items fall into which categories, etc. For example, if the vendor uses a particular taxonomy, or category, scheme such as the United Nations Standard Products and Services Codes (UN/SPSC), that can be used as well, e.g. for clustering products for testing purposes. Also, historical web logs and transaction data can be supplied through this interface. This provision can also continue, e.g. through streaming delivery of the information to the datamart 400, and the pricing module 410. The particular datamart loading procedures can be adjusted based on the vendor's capabilities and those of the selected datamart 400. For example, datamart technology from Sagent Technologies, Mountain View, Calif., could be used to provide the datamart.

Additionally, the segmentation scheme used by the electronic commerce vendor can be obtained, e.g. according to the vendor's own datamart analysis of purchasers and products, customer relationship management (CRM) system, enterprise resource planning (ERP) system, and/or the vendor's preferences. Some embodiments of the invention supply a base segmentation scheme for the customer segment axis 306 for differentiating between new and existing customers. Enabling this differentiation may require additional links between the vendor's systems and the pricing module 410, e.g. vendor's system signals the pricing module 410 when the user is an existing customer. Similarly, embodiments of the invention can obtain seasonality data from the vendor's systems, e.g. the database 102, the vendor's ERP system, the vendor's own datamart analysis of purchasers and products, and/or other sources.

Each of the pricing modes will now be considered in greater detail.

D. Manual Pricing Mode and Promotional Pricing Mode

The manual pricing 502 and promotional pricing 504 modes are non-automated pricing modes. Traditional prior art techniques can be used to set pricing unit prices. The administrative interface may support direct retrieval of pricing from the vendor's database, e.g. the database 102, direct entry of prices, and/or retrieval of prices from some other database. The pricing can be set per pricing unit, or for all segments for a given product, e.g. the price for the handbag is $X.

Figure 2:
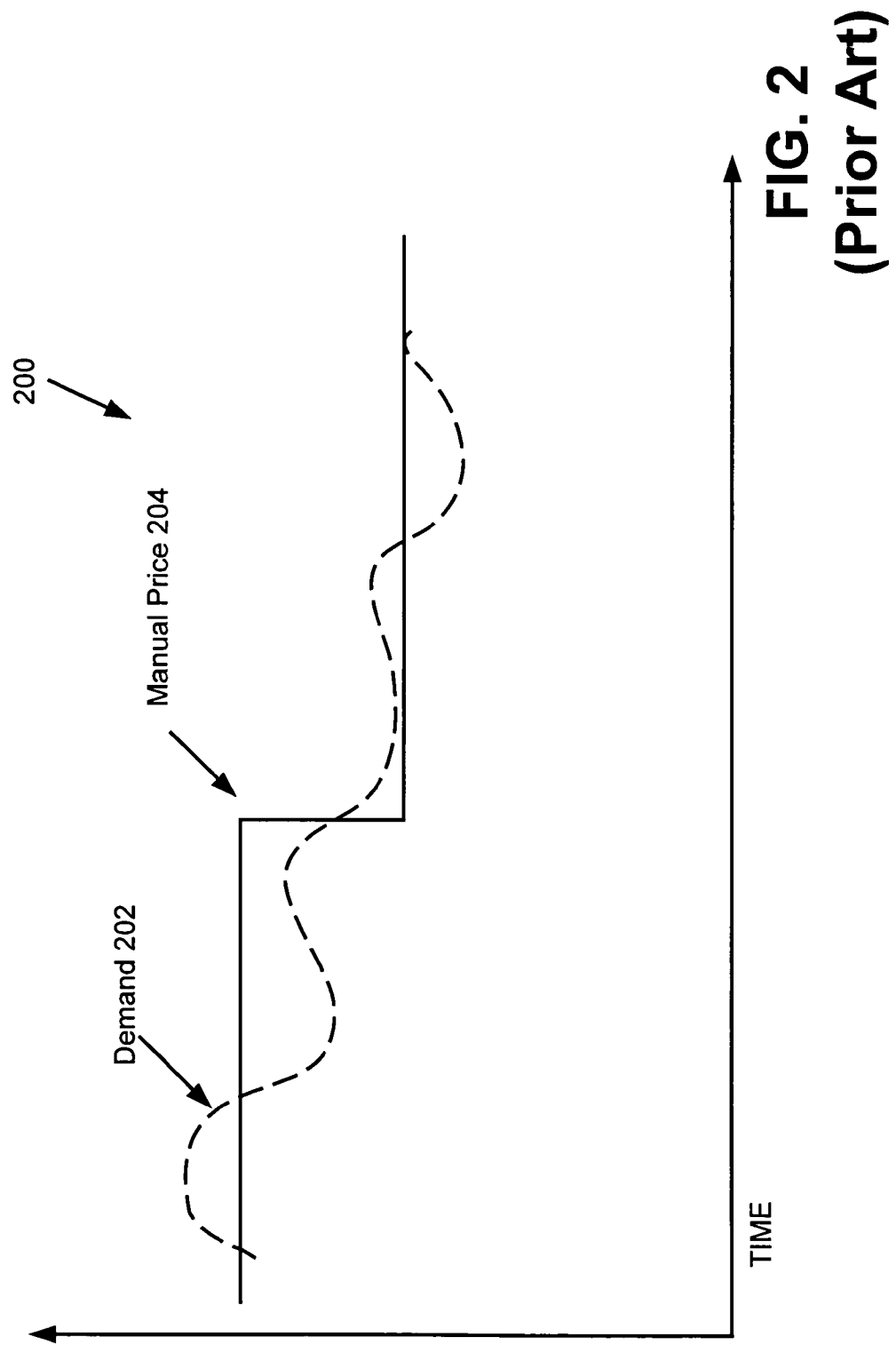
FIG. 2 demonstrates the effect of manual pricing as demand adjusts.

As noted, manual, or traditional, pricing models do not permit a vendor to maximize returns as shown by FIG. 2. However, a manual pricing mode is provided to allow vendors to select which items will be priced according to which methods. This may also be important if certain items must be priced according to contractual obligations, e.g. minimum price or fixed price.

Similarly, the promotional pricing 504 mode allows a vendor to run promotions without respect for a particular goal.

E. Automatic Pricing for Liquidation Mode

Embodiments of the invention support an automatic pricing for liquidation 506 mode. This mode allows for automatic price selection to enable product liquidation. Accordingly, the vendor indicates, e.g. using the administrative interface, in the vendor's database 102, and/or in some other database, that she/he would like to eliminate her stock of a product in a given time period, e.g. Y days. The system then automatically sets prices to sell the product within that time period. The demand measurement techniques described below can be used in conjunction with this pricing technique; however, instead strictly of applying a profit maximizing goal, the goal will be to maximize profit while ensuring that inventory is liquidated in Y days.

Accordingly, as demand for the given inventory item is sampled, a price will be selected that will allow the full remaining quantity to be liquidated by the goal date. For example, suppose 100 coats remain with 10 days left to liquidate the measurement. A price will be selected which, according to the measured demand, will sell the remaining inventory as slowly as possible (that is, at as high a price as possible), while still selling out by the end of the 10 day period.

F. Automatic Pricing

The automatic pricing 500 pricing mode offered by the pricing module 410 is designed to help vendors automatically reach better pricing decisions through automatic estimation and measurement of actual demand to select prices. Further, the specific demand estimation and measurement process is designed to minimize losses due to the testing process.

Figure 6:
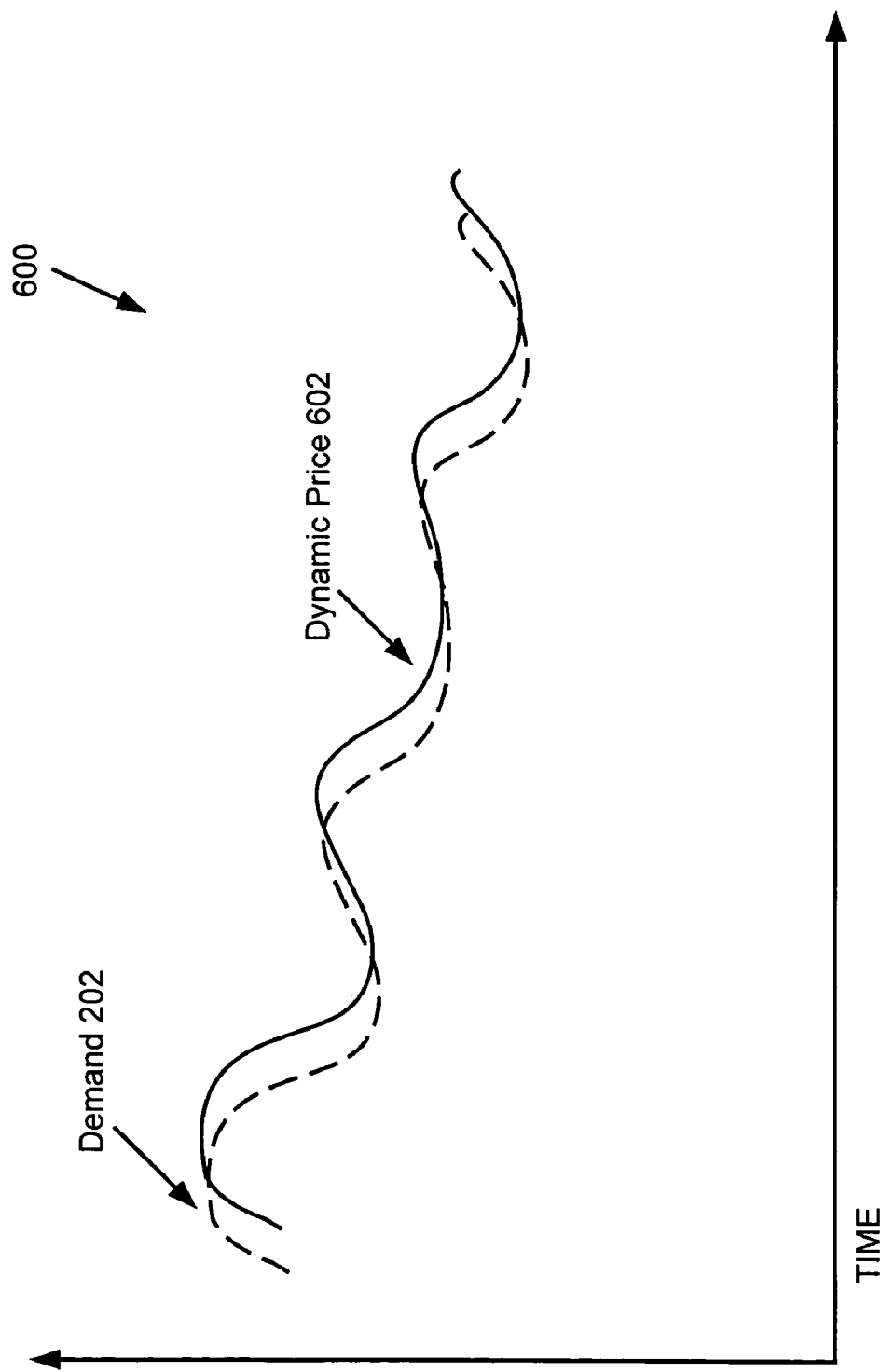
FIG. 6 demonstrates the effect of automatic pricing as demand adjusts.

FIG. 6 illustrates the goals of automatic pricing with graph 600 illustrating that the automatic price 602 for a pricing unit follows demand 202 for a pricing unit. Thus, the vendor is able to have her/his prices follow demand and receive a better price for the pricing unit at each time and thus greater overall profits. Further, because pricing unit prices are automatically determined using a mixture of: live price testing; competitive information (what competing vendors are charging for a product as determined through price checking and/or shopping agents); as well as any vendor supplied information, e.g. cost, merchandiser recommendations, manufacturer's suggested retail price, etc. This information can be provided through the administrative interface, from the vendor's database 102, and/or other databases. A dedicated shopping robot can be used, widely available shopping robots can be used, and/or human price shoppers can be used to obtain competitive pricing information.

The use of inputs, e.g. competitors' prices, serves to provide test points for the live testing process and also, when appropriate, as a "tie" breaker between two prices that have very similar results based on live price testing, e.g. take the price the competitor is using if the performance difference between the best found price and the competitor's price is less than some predetermined amount. However, in automatic pricing 502 mode, it is the actual results of the live price testing that determine the price.

Ultimately, the vendor can choose to override the selected price, e.g. by selecting the pricing unit for manual pricing. However, this is not recommended for the reason that the automatically determined price will be based upon actual demand—a quantitatively determined amount—whereas the manually set price is based on qualitative assumptions and models. As such, the automatically determined price will be goal maximizing, e.g. profit, revenue, etc. Further, as discussed below, the automatically determined price can account for customer lifetime value.

G. Price Testing Method

Figure 7:
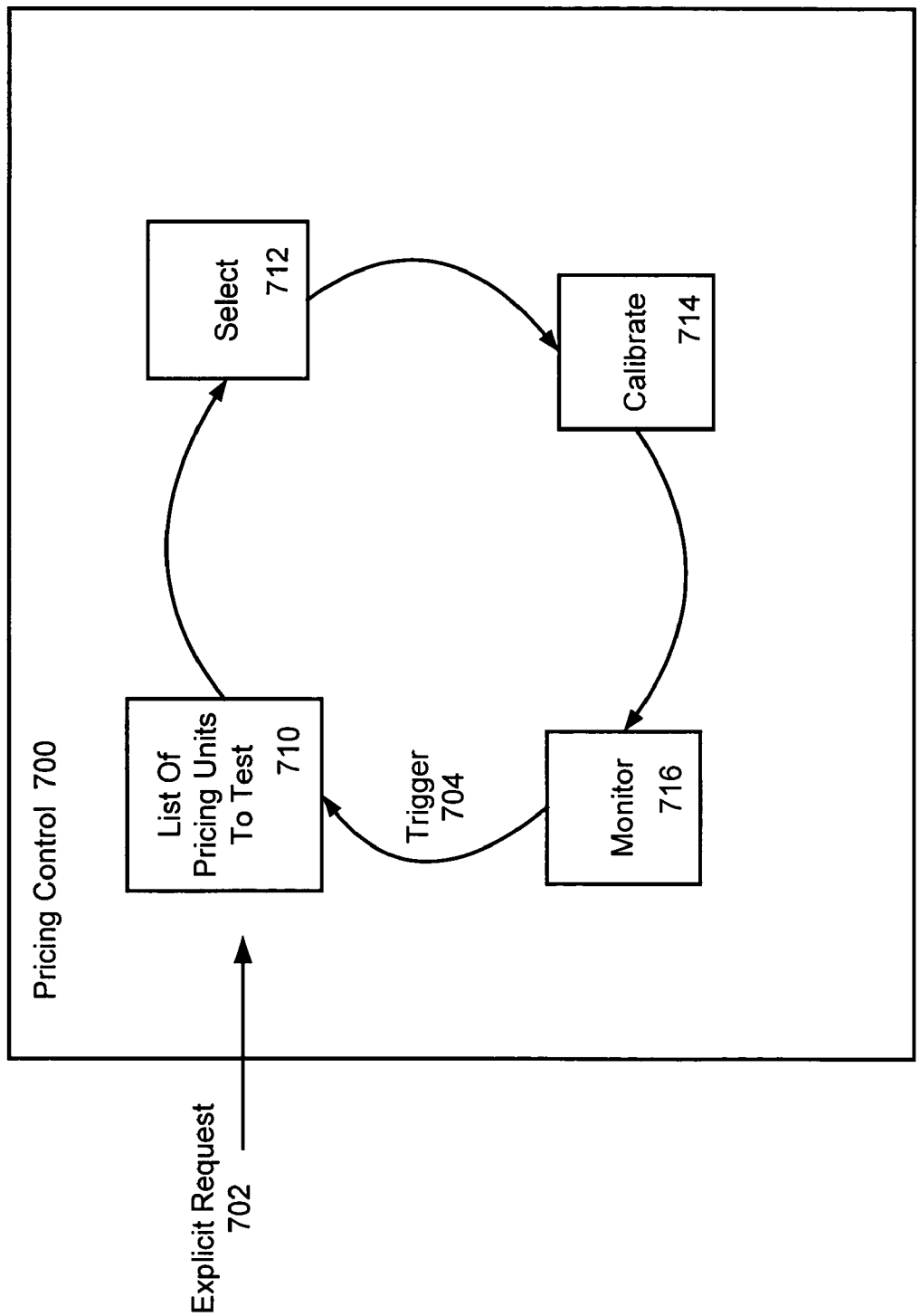
FIG. 7 illustrates the feedback loop controlling pricing.

The estimation and measurement of actual demand through live price testing enables various pricing modes to automatically select prices. The demand testing process will be described with reference to automatic pricing 502 mode. However, the same approach can be used for automated liquidation pricing 508 mode. FIG. 7 illustrates the feedback loop controlling pricing.

Pricing Feedback Loop

A list 710 of pricing units to test is maintained. Pricing units are added to the list 710 based upon explicit requests 702, e.g. the vendor signals that she/he would like a particular price unit automatically priced for the first time or that she/he would like to have price re-determined. Additionally, triggers 704 from the monitoring 716, described in greater detail below, can cause pricing units to be added to the list 710. The pricing control 700 controls the flow of all of the processes within the feedback loop.

The selection 712 process allows for orderly testing of demand. If too many pricing units are price tested simultaneously, the results may be affected by the other ongoing tests. Similarly, testing a single pricing unit without similar testing of related pricing units, e.g. Reebok™ shoes without testing Nike™ shoes, may cause distorted results.

Additionally, some individual pricing units may not have sufficient sales velocity for live price testing; accordingly, clustering can be used to test several pricing units simultaneously, with aggregate results used to determine the prices of the each of the pricing units. If appropriate, the selection 712 process can include querying one or more systems for automatic determination of suitable clusters of pricing units.

Another variant is testing multiple price units for bundling purposes. In this configuration, the vendor identifies a bundle of pricing units that she/he would like priced together, e.g. a pricing unit for a computer and a pricing unit for a monitor bundled together as a package. In this instance, the demand for the bundle can be measured and priced—possibly differently from the pricing for each pricing unit alone.

Accordingly, the list 710 is analyzed by the selection 712 process. This process can identify dependencies in testing like those described above, e.g. Reebok™ shoes and Nike™ shoes should be price tested at similar times. Once such dependencies are determined, the particular items being tested are passed to a calibration 714 process.

The pricing control 700 will exert control over the timing of individual tests. For example, if 100 products are currently being calibrated, the pricing control 700 can distribute the tests across time and implement vendor selected pricing policies. For example, no more than Z items tested simultaneously; no more than Y % of tested items with prices above, or below, the item's starting price, etc.

The calibration 714 process can occur for multiple pricing units in parallel and includes live price testing and is described in greater detail below. Once the calibration 714 process for a pricing unit is complete, that pricing unit is moved to monitor 716 process. Additionally, the tested pricing units can be removed from the list 710. The pricing control 700 can control the ongoing calibrations and monitoring while also allowing for additional selection of items.

Calibration Process

The calibration 714 process for one pricing unit will be considered. This can be used to estimate and measure demand for a pricing unit through live price testing.

Returning to the assumed demand curve shown in graph 320 of FIG. 3, the demand curve 322 is shown as a solid line. However, the actual demand may vary substantially. For practical reasons, it is not desirable to test a broad range of prices for pricing unit given the potential for testing losses and the long testing period. Therefore, a statistical approach can be employed. This approach relies on the fact that there is already substantial information and certainty about the initial, or current price, for a pricing unit. Further, it relies on the fact that it is easy to determine whether other prices are "better" or "worse" than the current price according to a selected goal function ($f$).

The specific goal function is vendor selectable. Several default goal functions are provided by embodiments of the invention: revenue (price times quantity); profit (price less cost times quantity); and also one of the above goals together with an accounting for customer lifetime value. Additionally, some embodiments of the invention include a liquidation goal.

Still other goal functions are possible. For example, a customer acquisition goal function is provided by some embodiments where the goal is to increase the number of new customers through aggressive pricing. This function can be defined in terms of an increase in the size of the customer base per unit time. Similarly, other embodiments include a customer retention goal function. In that instance, the goal is to decrease the customer churn rate (i.e. number of customers leaving). The function can be defined in terms of the percent of customers that were active customers a certain period of time ago, who are still active customers in the present period of time. In some embodiments of the invention, different goal functions can be selected for different customer segments of a given product unit. For example, a customer retention goal could be selected for the "existing customers" segment while the customer acquisition goal could be selected for the "new customer" segment.

Accordingly, the calibration 714 process can be thought of as having two primary phases: fixing and triage. In the first phase, fixing, the initial, or given, price for a pricing unit is tested for a long enough period of time to evaluate the look to buy (L2B) ratio for the pricing unit. The L2B ratio is the number of looks, e.g. web page views of the pricing unit, as compared to the number of purchases of the pricing unit. The L2B information can be obtained from log files and transactions on the web server 100. When the L2B ratio for the initial price is known within a predetermined statistical confidence, a lower bound on the goal function can be determined: $f_{min}=f(\$X)$, where $\$X$ is the initial price. Also, phase two, triage, can begin at this point.

In phase two, a list of candidate prices ($A, $B, $C, $D, etc.) can be quickly tested for short periods and the results compared with $f_{min}$. The candidate prices can be selected through competitive research, small perturbations of the initial price, merchandiser suggestions, manufacturer price suggestions, etc.

The results for the candidate prices can be evaluated using the goal function ($f$). The evaluation can take into account L2B and the confidence in the measure. For example, if the above four prices were tested, then $f(\$A)$, $f(\$D)$ are compared with $f_{min}$. Candidates that appear better than the initial price, e.g. $f(\text{price}) > f_{min}$ can be accepted for further triage. Candidates that perform poorer than the initial price are rejected, e.g. discarded from further consideration during this triage phase. Of the accepted candidates, one is selected as the new price and phase one, fix, is resumed with that as the starting price.

This two-phase process will continue until only a single price remains. As the number of tests in phase two, triage, is kept small, the testing costs incurred from selection of bad candidate prices are minimized. Further, each time phase one, fix, is re-entered, a price that appears to be better than the previous price, according to the goal function, is being used, e.g. the vendor is making more revenue/profit/etc.

A walkthrough of an example for a pricing unit, e.g. the pricing unit 310, may be helpful. Initially, the pricing unit has a starting price, $\$X$. Four candidate prices are selected, $A, $B, $C, and $D. The candidate prices may have been obtained through competitive research; perturbation of $\$X$, e.g. add/subtract a few %; a merchandiser's suggestion, and/or other sources. During phase one, fix, the L2B for $\$X$ is computed and $f_{min}$, is determined—to a certain confidence.

Next, at phase two, triage, short tests are conducted using the candidate prices ($A, $B, $C, and $D). Based on the results, $f($A), \ldots, f($D)$ are compared with $f_{min}$. In this instance, $f($A)$ and $f($B)$ appear better than $f_{min}$. Accordingly, $C and $D are rejected as candidate prices and removed from further consideration.

Phase one, fix, is restarted with one of $A and $B. In this instance $A was chosen because $f($A)>f($B)$. However, the choice could be random as well. After sufficient L2B information is determined a more confident estimation of $f($A)$ will be known. If the value of $f($A)$ is greater than $f_{min}$, then $f_{min}=f($A)$. If however, further testing reveals that $f($A)<f_{min}$, $f($A)$ can be eliminated from the candidate list and one of the remaining candidates selected for fixing.

In this example, $f($A)>f_{min}$ and so $f_{min}=f($A)$. Phase two, triage, then begins with short price tests of remaining candidates, e.g. $B. In this example, further testing reveals that $f($B)<f_{min}$, so it is eliminated as a candidate. Accordingly, $A is the new price and the testing process terminates as there are no further candidates for testing. Otherwise, the process would continue until only a single price remained.

As noted, various clustering approaches can be used to test multiple pricing units by estimating the demand for each pricing unit using the aggregate demand over a group of pricing units. The particular cluster selected can be dynamically generated across any of the segmentation axes. For example, a group of similar products within a product segment may be tested as one unit. Or, a group of similar customer segments for a single product may all be tested as one unit. Similarly, special pricing for bundled pricing units can be determined to select a price for the bundle based on the measured demand for the bundle.

Statistical Underpinnings

If q is the true demand for a given price, then the likelihood (L) that nbuys will be observed in nlooks is given by:

$$L(nlooks, nbuys \mid q) = \binom{nlooks}{nbuys} q^{nbuys} (1-q)^{1-nbuys}$$

where:

$$\binom{nlooks}{nbuys} = \frac{nlooks!}{nbuys!(nlooks - nbuys)!}.$$

Now, for a range a range of possible values of q, there is a prior distribution of probabilities P(q)=the probability that the true demand is q. From a given set of observations, nbuys out of nlooks, Bayesian updating can be used to update the probability distribution:

$$P_{posterior}(\text{demand}=q) = L(nlooks, nbuys \mid q) P_{prior}(\text{demand}=q).$$

The posterior distribution can be normalized to sum to 1 and be updated every time additional data is received by the system. At any point, a mean (average) estimate of demand can be computed together with the confidence value that the true demand is within a given interval of the mean:

$$\bar{q} = \sum_{q_{start}}^{q_{end}} qP(q)$$

with confidence $$P(q \in [q_0, q_f]) = \sum_{q_{start}}^{q_{end}} P(q).$$

Prior to receiving data, a uniform distribution can be used. The confidence is considered "good" when the confidence in a given interval around the mean value is above a predetermined threshold.

Inventory Liquidation Comment

In liquidation mode, only the monitor 716 process is needed. Given the liquidation time horizon, Y days; a minimum price, $MP; the number of units remaining N and the estimated L2B—which is related to sales velocity—for the product, the price can be set.

The monitor 716 process can examine the projected sell out date given the current L2B, time remaining to sell out date and units remaining. If the projected sell out time is past Y days, the price is lowered and monitoring continues. If the projected sell out time is before Y days, the price can be raised slightly and monitoring continued.

As a fall back, a "panic mode" can be provided where the price is dropped to $MP, the minimum price, if more than a vendor selected amount of inventory is remaining at a certain point prior to the Y day deadline. In still other embodiments, the vendor may opt to allow the price to free float to ensure liquidation, e.g. set $MP=$0.

Two pricing options can also be provided monotonic and non-monotonic. In monotonic pricing, the monitor 716 process only lowers the price. Therefore, the price is lowered in small increments, but perhaps rapidly. If the price is too low, the price is held despite the fact that sell out may occur prior to the Y day deadline. In non-monotonic pricing, the price can be raised and lowered during the liquidation process so as to sell as slowly as possible (maximizing goal) while still selling out the inventory.

Monitoring and Triggers

As FIGS. 6 and 7 suggest, the automatic price should be adjusted as demand changes with time. This is accomplished through monitoring of pricing unit sales. An expected value for the goal function, e.g. $f$(selected price), was determined by the calibration 714 process for a given pricing unit. The monitoring 716 process can use that expected value and monitor results from actual sales.

If the actual results, $f_{actual}$(selected price), are varying outside a predetermined range, e.g. confidence interval plus or minus a vendor selectable reactivity setting, then the price should be adjusted. At first, information derived from the earlier calibration 714 process can be used to estimate the change to the demand curve, and accordingly a new price. That new price can be monitored and if adjustments are too frequently needed or the value of the objective function cannot be maintained, then a trigger, e.g. the trigger 704, can be sent to cause a new calibration for that pricing unit.

The range of deviation allowed from the goal is in part set by the confidence in the estimation of the initial expected value. That can then be further adjusted by a vendor selectable amount to increase, or decrease, the tolerance for deviation between the actual results and the predicted results. A large vendor selected range will increase price certainty, but decrease reactivity to changes in demand. A small vendor selected range will increase system reactivity, but decrease price certainty for end customers who may find that prices are fluctuating too frequently for a particular pricing unit. Where appropriate, different vendor selected ranges can be applied to different pricing units.

Thus, the process acts as a large feedback loop with monitoring causing triggers which serve to cause demand estimation and measurement and in turn cause the selection of new prices. The pricing determinations can be made on a per pricing unit basis, e.g. according to a vendor's segmentation model. For example, some electronic commerce vendors may segment customers according to whether they use shopping robots or not, accordingly, different prices could be offered to each of those two customer segments.

As noted, the goal function is vendor selectable, it can also be vendor designed to meet vendor specific needs. Embodiments of the invention may support an application programmers interface (API) for defining goal functions and/or allow the definition of goal functions via the administrative interface.

One particularly difficult problem for electronic commerce vendors is ascertaining the value of their customer relations. The next section describes an approach to valuing the customer quantitatively for use as part of a goal function.

H. Accounting for Repeat Business: Quantifying the Lifetime Value of the Customer Until now, the goal function has been considered as $f$(price). However, the goal function has not explicitly accounted for the benefits of return business, e.g. balancing the short term goal ($f$) versus the longer term value of a customer over her/his lifetime.

Lifetime customer value can be modeled as an exponential distribution: P(return to buy|buy today)=kP(buy today), or in words: the probability that a customer will make a return purchase—given that they bought something—is proportional (k) to the probability that the customer made the initial purchase. The proportionality constant (k) can range from zero to one.

With some assumptions a model of average behavior of customers can be arrived at: P(return N times|bought N−1 times)=kP(bought N−1 times), which equals P(return N times|bought once)=$k^N$ P(bought once), assuming that k is independent of purchase price and independent of a customer's previous purchases. This average therefore is over all customers in the population (e.g. it can be subdivided by segments), over all of their purchases, irrespective of the price of each purchase.

This model can be verified using historical data. From a particular initial group of customers the number of customers in that group who made 1, 2, 3, . . . N purchases can be tabulated. It is particularly important that when considering a person who made, for example, 5 purchases, that that same person was counted as having made 1, 2, 3, and 4 purchases. The proportionality constant, k, can be estimated by a line fit through the logarithm of the counts with the exponent of the slope of the line being an estimate of k.

This model however can be further extended to account for different probabilities of return, e.g. different k at different stages of a customer's life cycle (based on the number of purchases made). In this configuration, a piecewise linear fit to the above curve can compute a different k for each stage of a customer's lifecycle. This helps capture the fact that there may be a significant drop off in repeat business after a given number of purchases, e.g. 5 purchases, that would change the way the customer lifetime value should be viewed after she/he has made five purchases.

Still further extensions are possible, the timing of the repeat visits can be considered as well. If intervals between purchases are known for customers and the maximum time period is T days, one of the above types of graphs can be considered by ignoring data for customers (in the tabulation process above) where the time period between purchases exceeded the T day horizon. For example, if a customer's third purchase was outside the T day horizon, then she/he would not be tabulated as having made a third purchase. Accordingly, the "lifetime" value of the customer with the time horizon of T days can be ascertained, e.g. how valuable is this customer to me over the next hour, day, week, month, year, etc.

This estimate of retention rate can be used to estimate lifetime value for a customer:

$$LTV = \sum_{n=1}^{\infty} k^n a,$$

where a is the average value of a purchase according to the basic goal function, e.g. average revenue per purchase, average profit per purchase, etc. The summand can be computed to a given level of precision, e.g. stop when the increase is less than a predetermined amount.

The value for a can easily be determined from past transactions for customers within a particular customer segment.

If a piecewise curve fit approach has been used to estimate a different k for different stages of the customer lifecycle, then the different values of k for each stage of the customer's life should be used with the formula for LTV suitably modified.

Estimations of the LTV can be used to further optimize pricing with respect to a specific customer, given knowledge of that customer's purchase history and which customer segment he or she belongs to. For example, by discounting a product for a certain customer segment, we increase the demand for the product within that customer segment, and hence increase the number of those customers from whom we can expect to extract the Lifetime Value. This increased demand comes at the cost of a suboptimal immediate gain. By quantifying this tradeoff, we can enable a vendor to balance an appropriate short term loss against the likelihood of future returns. Specifically, once the optimal price for a product has been determined by the methods above, the information about the demand curve generated by the live price testing can be used to estimate how a certain discount will increase the demand for the product. Estimations of the LTV can be used to map that increased demand into an increase in the expected gain from a given group of customers (e.g., a group of customers in a given segment who have made a given number of purchases), over a given period of time. Thus, we can determine a schedule of discounts based around the nominal optimal price, in order to attract and retain the most valuable customers.

Additional Applications

The lifetime customer value modeling approach can also be used outside of the automatic pricing mode, e.g. to adjust manually set prices. In fact, it can even be applied in traditional retail environments. An example will be helpful.

Consider a retailer (either brick-and-mortar, online, or a mixture of the two), Retailer, that sells products to customers and uses a customer loyalty card, e.g. supermarket card; a store credit card; and/or some other mechanism whereby customer identities for repeat business purposes can be ascertained. In such an instance, LTV can be computed for those customers and prices for some items downwardly adjusted to reflect the customer's LTV.

Accordingly, a customer could enter Retailer, select several items and identify themselves. Based on that customer's LTV, prices for one or more items they selected could be lowered. The specific amount the prices are lowered can be a function of the LTV, e.g. g(LTV). Thus, if the LTV for a customer is $1000, a portion of that $1000 could be returned now as a bonus discount.

An explanation of how this is relevant will be helpful. Consider Competitor, a competitive retailer to Retailer who does not offer bonus discounts. Like Retailer, Competitor attempts to select the best prices for its products. If both Retailer and Competitor have online components, they may use the automatic pricing mode to optimize their pricing.

Consider then Customer: Customer has a choice between shopping at Retailer and Competitor for a particular set of goods. Customer will know that if she goes to Competitor she will pay a price set by Competitor that is short term goal maximizing, e.g. it cannot accurately reflect Customer's value to Competitor. On the other hand, Customer will know that Retailer will give her discounts to encourage her to return. Retailer is confident in its targeting of discounts to Customer based on the quantitative assessment of Customer's LTV, and what stage Customer is at in that lifetime, etc. Accordingly, Retailer's pricing may be better for Customer than Competitor's, but also goal maximizing for Retailer in the long term since it will not give undue discounts.

I. Conclusion

Thus, an automatic pricing method and apparatus has been described. The automatic pricing method is applicable to electronic commerce environments where non-negotiated, non-auction transactions are occurring. The method reduces the need for electronic commerce vendors to manually determine prices for their products and services. Instead, the automatic pricing method uses live price testing to estimate and measure demand and allow price to be set according to a vendor selectable goal. The goal can balance short term gains versus long term gains.

Additionally, an approach to measuring customer lifetime value has been described that can be used both in an electronic commerce environment and in traditional bricks-and-mortar stores to allow prices to be adjusted to account for long term benefits to the vendor according to a quantitative model of customer lifetime value.

In some embodiments, the pricing module 410 can be hardware based, software based, or a combination of the two. In some embodiments, pricing module 410 is comprised of one or more computer programs that are included in one or more computer usable media such as CD-ROMs, floppy disks, or other media. In some embodiments, pricing module programs, pricing mode programs, automatic pricing mode programs, automatic liquidation mode pricing programs, and/or connectivity programs between an electronic commerce vendor and a pricing module are included in one or more computer usable media.

Some embodiments of the invention are included in an electromagnetic wave form. The electromagnetic waveform comprises information such as pricing mode programs and pricing module programs. The electromagnetic waveform may include the programs accessed over a network.

The foregoing description of various embodiments of the invention has been presented for purposes of illustration and description. It is not intended to limit the invention to the precise forms disclosed. Many modifications and equivalent arrangements will be apparent.

What is claimed is:

1. A method of pricing a product for sale, the method comprising:
   testing each price of a plurality of prices by sending a first set of electronic messages over a network to devices;
   wherein said electronic messages include offers of said product;
   wherein said offers are to be presented to potential customers of said product to allow said potential customers to purchase said product for the prices included in said offers;
   wherein the devices are programmed to communicate offer terms, including the prices contained in the messages received by the devices;
   wherein the devices are programmed to receive offers for the product based on the offer terms;
   wherein the devices are not configured to fulfill orders by providing the product;
   wherein each price of said plurality of prices is used in the offer associated with at least one electronic message in said first set of electronic messages;
   gathering, within a machine-readable medium, statistics generated during said testing about how the potential customers responded to the offers, wherein the statistics include number of sales of the product made at each of the plurality of prices;
   using a computerized system to read said statistics from said machine-readable medium and to automatically determine, based on said statistics, an estimated outcome of using each of the plurality of prices for the product;
   selecting a price at which to sell said product based on the estimated outcome determined by said computerized system; and
   sending a second set of electronic messages over the network, wherein the second set of electronic messages include offers, to be presented to potential customers, of said product at said selected price.

2. The method of claim 1, wherein the step of sending a first set of electronic messages includes sending the first set of electronic messages directly to potential customers.

3. The method of claim 2 wherein the step of sending a first set of electronic messages to potential customers includes sending web pages to potential customers, wherein the web pages offer the product for one of the plurality of prices that are being tested.

4. The method of claim 1, wherein the step of sending a second set of electronic messages over the network includes sending the second set of electronic messages to potential customers.

5. The method of claim 4, wherein:
   the step of selecting a price is performed by causing said computerized system to automatically select a price based on the estimated outcome; and
   the step of sending the second set of electronic messages to potential customers includes sending web pages to potential customers, wherein the web pages include an advertisement that offers the product for the price selected by said computerized system.

6. The method of claim 1 wherein the step of selecting a price is performed by causing said computerized system to automatically select a price based on the estimated outcome.

7. The method of claim 1 wherein:
   the step of testing each price includes generating a value for each price based on how the potential customers responded to offers that contained said price; and the value generated for each price represents an outcome of offering the product for the corresponding price.

8. The method of claim 7 further comprising the steps of:
testing a current price by repeatedly performing the following steps until the value generated for the current price represents the outcome within a predetermined statistical confidence:
sending electronic messages that offer said product at said current price, and
gathering statistics about how the potential customers responded to the offers that contain the current price.

9. The method of claim 7 wherein:
the method includes the step of testing a current price by:
sending electronic messages that offer said product at said current price;
gathering statistics about how the potential customers responded to the offers that contain the current price;
generating a value for the current price based on how the potential customers responded to offers that contained said current price; and
the step of selecting a price includes the steps of:
performing comparisons between the value generated for the current price with the values generated for each price of the plurality of prices; and
selecting a particular price of the plurality of prices based on said comparisons.

10. The method of claim 9 wherein:
the plurality of prices constitute a plurality of candidates for replacing said current price as the price for said product; and
the method further comprises the step of ceasing to consider one or more prices of said plurality of prices as candidates for replacing said current price based on the values generated for said one or more prices.

11. The method of claim 7 wherein the step of generating a value that represents an outcome of offering the product for the corresponding price includes generating a value that is based on an estimate of revenue that would result from offering the product for the corresponding price.

12. The method of claim 7 wherein the step of generating a value that represents an outcome of offering the product for the corresponding price includes generating a value that is based on an estimate of profit that would result from offering the product for the corresponding price.

13. The method of claim 7 wherein the step of generating a value that represents an outcome of offering the product for the corresponding price includes generating a value that is based on an estimate of a customer lifetime value that would result from offering the product for the corresponding price.

14. The method of claim 7 wherein the step of generating a value that represents an outcome of offering the product for the corresponding price includes generating a value that is based on an estimate of customer acquisition that would result from offering the product for the corresponding price.

15. The method of claim 7 wherein the step of generating a value that represents an outcome of offering the product for the corresponding price includes generating a value that is based on an estimate of customer retention that would result from offering the product for the corresponding price.

16. The method of claim 1 wherein the step of testing a price includes:
tracking how many potential customers are presented offers that offer said product at said price; and
tracking how many of the potential customers that are presented with offers that offer said product at said price completed a purchase of the product.

17. The method of claim 16 further comprising generating statistics during said testing by generating a conversion ratio for each price of said plurality of prices based on
how many potential customers are presented with an offer of said product at said price; and
how many of the potential customers that are presented an offer of said product at said price completed a purchase of the product.

18. The method of claim 17 wherein:
the first set of messages are sent to potential customers to present said potential customers with the offers contained in the messages; and
the step of generating a conversion ratio includes generating a look to buy (L2B) ratio for each price of said plurality of prices based on
how many potential customers are presented with electronic messages that offer said product at said price; and
how many of the potential customers that are presented with electronic messages that offer said product at said price completed a purchase of the product.

19. The method of claim 1 wherein:
the product has a current price;
the current price is associated with a first value that represents and estimate of an outcome of selling the product at the current price;
the first value is associated with a particular confidence value;
the method further comprises the steps of
generating a second value for the current price based on how potential customers respond to electronic messages that contain offers of the product at the current price; and
establishing a previously presented price for the product if the second value is outside a range defined by the first value plus or minus the confidence value.

20. The method of claim 1 wherein:
the product has a current price;
the current price is associated with a first value that represents and estimate of an outcome of selling the product at the current price;
the first value is associated with a particular confidence value;
the product is associated with a particular reactivity threshold;
the method further comprises the steps of
generating a second value for the current price based on how potential customers respond to electronic messages that contain offers of the product at the current price; and
establishing a previously presented price for the product if the second value is outside a range defined by the first value plus or minus (the confidence value plus the reactivity threshold).

21. The method of claim 1 wherein the product is a service for sale.

22. The method of claim 1 wherein:
the product is a first product of a plurality of products;
said plurality of products includes a second product;
the first product corresponds to a first pricing unit in a segmentation scheme;
the second product corresponds to a second pricing unit in the segmentation scheme;
both the first pricing unit and the second pricing unit are associated with the same stock-keeping unit (SKU);

the method further comprises, for each product of said plurality of products, performing the steps of testing, gathering, and selecting; and wherein the price selected for said first product is selected independent of the price selected for said second product.

23. The method of claim 22 wherein:

the first pricing unit is associated with a first season; and the second pricing unit is associated with a second season that is different from said first season.

24. The method of claim 22 wherein:

the first pricing unit is associated with previously presented customers; and the second pricing unit is associated with existing customers.

25. The method of claim 22 wherein:

the first pricing unit is associated with customers that are presented the offers in a first manner; and the second pricing unit is associated with customers that are presented the offers in a second manner that is different from said first manner.

26. The method of claim 1 wherein:

the product is a first product of a plurality of products;

the first product corresponds to a plurality of pricing units in a segmentation scheme; and the method further comprises, for each product of said plurality of products, performing the steps of testing, gathering, and selecting.

27. A computer-readable medium carrying instructions which, when executed by one or more processors, cause the one or more processors to price a product for sale by performing the steps of:

testing each price of a plurality of prices by sending a first set of electronic messages over a network to devices;

wherein said electronic messages include offers of said product;

wherein said offers are to be presented to potential customers of said product to allow said potential customers to purchase said product for the prices included in said offers;

wherein the devices are programmed to communicate offer terms, including the prices contained in the messages received by the devices;

wherein the devices are programmed to receive orders for the product based on the offer terms;

wherein the devices are not configured to fulfill orders by providing the product;

wherein each price of said plurality of prices is used in the offer associated with at least one electronic message in said first set of electronic messages;

gathering, within a machine-readable medium, statistics generated during said testing about how the potential customers responded to the offers, wherein the statistics include number of sales of the product made at each of the plurality of prices;

using a computerized system to read said statistics from said machine-readable medium and to automatically determine, based on said statistics, an estimated outcome of using each of the plurality of prices for the product;

selecting a price at which to sell said product based on the estimated outcome determined by said computerized system; and sending a second set of electronic messages over the network, wherein the second set of electronic messages include offers, to be presented to potential customers, of said product at said selected price.

28. The computer-readable medium of claim 27, wherein the step of sending a first set of electronic messages includes sending the first set of electronic messages directly to potential customers.

29. The computer-readable medium of claim 28 wherein the step of sending a first set of electronic messages to potential customers includes sending web pages to potential customers, wherein the web pages offer the product for one of the plurality of prices that are being tested.

30. The computer-readable medium of claim 27, wherein the step of sending a second set of electronic messages over the network includes sending the second set of electronic messages to potential customers.

31. The computer-readable medium of claim 30, wherein:

the step of selecting a price is performed by causing said computerized system to automatically select a price based on the estimated outcome; and the step of sending the second set of electronic messages to potential customers includes sending web pages to potential customers, wherein the web pages include an advertisement that offers the product for the price selected by said computerized system.

32. The computer-readable medium of claim 27 wherein the step of selecting a price is performed by causing said computerized system to automatically select a price based on the estimated outcome.

33. The computer-readable medium of claim 27 wherein:

the step of testing each price includes generating a value for each price based on how the potential customers responded to offers that contained said price; and the value generated for each price represents an outcome of offering the product for the corresponding price.

34. The computer-readable medium of claim 33 further comprising the steps of:

testing a current price by repeatedly performing the following steps until the value generated for the current price represents the outcome within a predetermined statistical confidence:

sending electronic messages that offer said product at said current price, and gathering statistics about how the potential customers responded to the offers that contain the current price.

35. The computer-readable medium of claim 33 wherein:

the computer-readable medium includes the step of testing a current price by:

sending electronic messages that offer said product at said current price;

gathering statistics about how the potential customers responded to the offers that contain the current price;

generating a value for the current price based on how the potential customers responded to offers that contained said current price; and the step of selecting a price includes the steps of:

performing comparisons between the value generated for the current price with the values generated for each price of the plurality of prices; and selecting a particular price of the plurality of prices based on said comparisons.

36. The computer-readable medium of claim 35 wherein:

the plurality of prices constitute a plurality of candidates for replacing said current price as the price for said product; and the computer-readable medium further comprises the step of ceasing to consider one or more prices of said plurality of prices as candidates for replacing said current price based on the values generated for said one or more prices.

37. The computer-readable medium of claim 33 wherein the step of generating a value that represents an outcome of offering the product for the corresponding price includes generating a value that is based on an estimate of revenue that would result from offering the product for the corresponding price.

38. The computer-readable medium of claim 33 wherein the step of generating a value that represents an outcome of offering the product for the corresponding price includes generating a value that is based on an estimate of profit that would result from offering the product for the corresponding price.

39. The computer-readable medium of claim 33 wherein the step of generating a value that represents an outcome of offering the product for the corresponding price includes generating a value that is based on an estimate of a customer lifetime value that would result from offering the product for the corresponding price.

40. The computer-readable medium of claim 33 wherein the step of generating a value that represents an outcome of offering the product for the corresponding price includes generating a value that is based on an estimate of customer acquisition that would result from offering the product for the corresponding price.

41. The computer-readable medium of claim 33 wherein the step of generating a value that represents an outcome of offering the product for the corresponding price includes generating a value that is based on an estimate of customer retention that would result from offering the product for the corresponding price.

42. The computer-readable medium of claim 27 wherein the step of testing a price includes:
tracking how many potential customers are presented offers that offer said product at said price; and
tracking how many of the potential customers that are presented with offers that offer said product at said price completed a purchase of the product.

43. The computer-readable medium of claim 42 further comprising generating statistics during said testing by generating a conversion ratio for each price of said plurality of prices based on
how many potential customers are presented with an offer of said product at said price; and
how many of the potential customers that are presented an offer of said product at said price completed a purchase of the product.

44. The computer-readable medium of claim 43 wherein:
the first set of messages are sent to potential customers to present said potential customers with the offers contained in the messages; and
the step of generating a conversion ratio includes generating a look to buy (L2B) ratio for each price of said plurality of prices based on
how many potential customers are presented with electronic messages that offer said product at said price; and
how many of the potential customers that are presented with electronic messages that offer said product at said price completed a purchase of the product.

45. The computer-readable medium of claim 27 wherein:
the product has a current price;
the current price is associated with a first value that represents and estimate of an outcome of selling the product at the current price;
the first value is associated with a particular confidence value;
the computer-readable medium further comprises the steps of
generating a second value for the current price based on how potential customers respond to electronic messages that contain offers of the product at the current price; and
establishing a previously presented price for the product if the second value is outside a range defined by the first value plus or minus the confidence value.

46. The computer-readable medium of claim 27 wherein:
the product has a current price;
the current price is associated with a first value that represents and estimate of an outcome of selling the product at the current price;
the first value is associated with a particular confidence value;
the product is associated with a particular reactivity threshold;
the computer-readable medium further comprises the steps of
generating a second value for the current price based on how potential customers respond to electronic messages that contain offers of the product at the current price; and
establishing a previously presented price for the product if the second value is outside a range defined by the first value plus or minus (the confidence value plus the reactivity threshold).

47. The computer-readable medium of claim 27 wherein the product is a service for sale.

48. The computer-readable medium of claim 27 wherein:
the product is a first product of a plurality of products;
said plurality of products includes a second product;
the first product corresponds to a first pricing unit in a segmentation scheme;
the second product corresponds to a second pricing unit in the segmentation scheme;
both the first pricing unit and the second pricing unit are associated with the same stock-keeping unit (SKU);
the computer-readable medium further comprises, for each product of said plurality of products, performing the steps of testing, gathering, and selecting; and
wherein the price selected for said first product is selected independent of the price selected for said second product.

49. The computer-readable medium of claim 48 wherein:
the first pricing unit is associated with a first season; and
the second pricing unit is associated with a second season that is different from said first season.

50. The computer-readable medium of claim 48 wherein:
the first pricing unit is associated with previously presented customers; and
the second pricing unit is associated with existing customers.

51. The computer-readable medium of claim 48 wherein:
the first pricing unit is associated with customers that are presented the offers in a first manner; and
the second pricing unit is associated with customers that are presented the offers in a second manner that is different from said first manner.

52. The computer-readable medium of claim 27 wherein:
the product is a first product of a plurality of products;
the first product corresponds to a plurality of pricing units in a segmentation scheme; and
the computer-readable medium further comprises, for each product of said plurality of products, performing the steps of testing, gathering, and selecting.

53. The method of claim 1 wherein the computerized system is located remotely relative to said devices.

54. The method of claim 1 wherein the step of sending a first set of electronic messages over a network to devices is performed by a web server sending web pages to computers that are executing browsers configured to interpret and render the web pages.

55. The method of claim 1 wherein the step of selecting a price at which to sell said product based on the estimated outcome is performed at a location that is remote relative to said devices.

56. The method of claim 1 wherein the step of testing each price includes serially testing each of the prices by:
   during a first period of time, including a first price in any offer messages sent to any of said devices, wherein the first price is included without regard to which specific devices the offer messages are being sent; and
   during a second period of time, including a second price in any offer messages sent to any of said devices, wherein the second price is included without regard to which specific devices the offer messages are being sent.

57. The method of claim 1 wherein the step of testing each price includes testing at least some of the prices in parallel by:
   during a particular period of time, including a first price in messages sent to a first plurality of said devices; and
   during said particular period of time, including a second price in messages sent to a second plurality of said devices.

58. The computer-readable medium of claim 27 wherein the computerized system is located remotely relative to said devices.

59. The computer-readable medium of claim 27 wherein the step of sending a first set of electronic messages over a network to devices is performed by a web server sending web pages to computers that are executing browsers configured to interpret and render the web pages.

60. The computer-readable medium of claim 27 wherein the step of selecting a price at which to sell said product based on the estimated outcome is performed at a location that is remote relative to said devices.

61. The computer-readable medium of claim 27 wherein the step of
   testing each price includes serially testing each of the prices by:
   during a first period of time, including a first price in any offer messages sent to any of said devices, wherein the first price is included without regard to which specific devices the offer messages are being sent; and
   during a second period of time, including a second price in any offer messages sent to any of said devices, wherein the second price is included without regard to which specific devices the offer messages are being sent.

62. The computer-readable medium of claim 27 wherein the step of
   testing each price includes testing at least some of the prices in parallel by:
   during a particular period of time, including a first price in messages sent to a first plurality of said devices; and
   during said particular period of time, including a second price in messages sent to a second plurality of said devices.

\* \* \* \* \*

UNITED STATES PATENT AND TRADEMARK OFFICE
CERTIFICATE OF CORRECTION

| | | |
|---|---|---|
| PATENT NO. | : 7,970,713 B1 | Page 1 of 1 |
| APPLICATION NO. | : 09/568001 | |
| DATED | : June 28, 2011 | |
| INVENTOR(S) | : Vladimir Gorelik et al. | |

It is certified that error appears in the above-identified patent and that said Letters Patent is hereby corrected as shown below:

COLUMN 16
Claim 1: Line 15: delete "receive offers for" and insert --receive orders for--.

COLUMN 18
Claim 19: Line 26: delete "and estimate" and insert --an estimate--.

Claim 20: Line 42: delete "and estimate" and insert --an estimate--.

COLUMN 21
Claim 45: Line 64: delete "and estimate" and insert --an estimate--.

COLUMN 22
Claim 46: Line 13: delete "and estimate" and insert --an estimate--.

Signed and Sealed this
Ninth Day of August, 2011

David J. Kappos
*Director of the United States Patent and Trademark Office*